C. A. M. WEBER.
AUTOMATIC SWITCHING ARRANGEMENT FOR ELECTRIC MOTORS.
APPLICATION FILED JULY 11, 1916.

1,316,009. Patented Sept. 16, 1919.

WITNESSES:
R. J. Fitzgerald
O. W. Kennedy

INVENTOR
Clifford A. M. Weber.
BY
Wesley G. Carr
ATTORNEY

UNITED STATES PATENT OFFICE.

CLIFFORD A. M. WEBER, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

AUTOMATIC SWITCHING ARRANGEMENT FOR ELECTRIC MOTORS.

1,316,009.   Specification of Letters Patent.   Patented Sept. 16, 1919.

Application filed July 11, 1916. Serial No. 108,575.

*To all whom it may concern:*

Be it known that I, CLIFFORD A. M. WEBER, a citizen of the United States, and a resident of Edgewood Park, in the county of Allegheny and State of Pennsylvania, have invented a new and useful Improvement in Automatic Switching Arrangements for Electric Motors, of which the following is a specification.

My invention relates to automatic switching systems for reversing electric motors and is particularly adapted for use in connection with motors that are provided with auxiliary starting devices and are dependent in operation upon motor-speed conditions.

Motors of the above-described type include single-phase commutator motors that are adapted for repulsion operation during the starting period and for induction operation after reaching a predetermined speed, and other single-phase motors of the so-called split-phase type that are provided with auxiliary starting windings which are operative only during the starting period. It is well known that a single-phase induction motor will not reverse when current is reversed in its windings unless the reversing switch is held open long enough to allow the starting winding, or other automatic starting device, to become effective. Since the operation of the starting winding or other device is usually dependent upon the speed of the motor, it is obvious that it requires considerable judgment on the part of the operator in order to throw the reversing switch over at the proper moment. It is also obvious that the apparatus driven by the motor may be damaged or its operation seriously interfered with when the motor fails to reverse because of improper manipulation of the reversing switch. Or, it may be desirable to provide for the reversal of a direct-current motor only when the motor is operating below a predetermined speed.

It is the object of my invention to provide a switching arrangement for reversing an electric motor by means of which it is impossible for current to be reversed in the motor prior to the operation of a suitable speed-controlled device, regardless of direction in which the reversing switch may be thrown.

Figure 1:
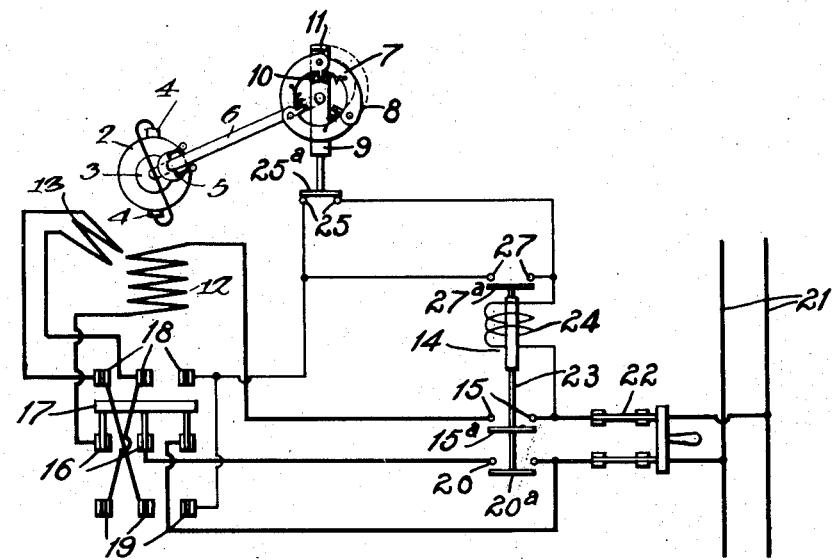
Figure 2:
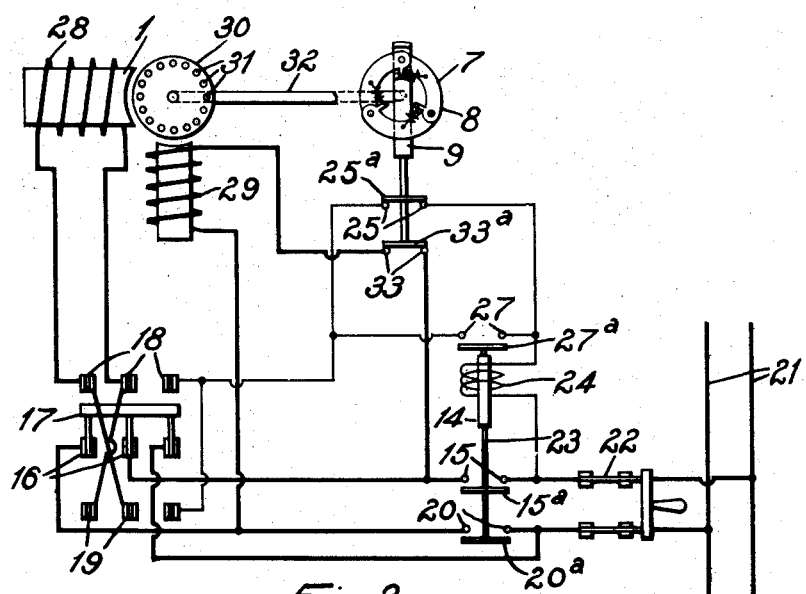

In the accompanying drawings, Figure 1 is a diagrammatic view of my switching system as applied to a single-phase motor of the repulsion-induction type, and Fig. 2 is a view, similar to Fig. 1, showing my invention as applied to a motor of the split-phase type.

The motor shown in Fig. 1 comprises a field magnet 1 and an armature 2 provided with a commutator cylinder 3 having short-circuited brushes 4 coöperating therewith. A centrifugally-actuated short-circuiting device 5 is mounted on the shaft 6 of the armature 2 and is adapted to short-circuit the segments of the commutator cylinder when the motor reaches a predetermined speed. The short-circuiting device 5 may be one of several well known types, such, for example, as the device shown in Patent No. 1,090,328. A centrifugally-actuated circuit-controlling device 7 is also mounted on the shaft 6 and may be of any known type but is preferably constructed in accordance with the disclosure in a copending application, Serial No. 863,569, filed Sept. 24, 1914, by G. W. Hansell and assigned to the Westinghouse Electric & Manufacturing Company. The device 7 generally comprises a composite ring 8 that is adapted to expand or contract in accordance with the speed of the shaft 6. A reciprocally-mounted member 9, that is longitudinally stationary with respect to the shaft 6, is provided with projections 10 and 11 that are adapted to be engaged by the inner and outer peripheries of the ring 8, respectively, the ring being shown in its contracted form and the member 9 in its lower position.

In Fig. 1, the exciting winding is diagrammatically shown at 12, and the reversing or auxiliary winding at 13. One terminal of the main winding 12 is connected to the left-hand stationary contact member 15 of an electrically-operated switch 14 and the other terminal thereof is connected to the left-hand movable contact member 16 of a three-pole double-throw reversing switch 17. The respective terminals of the reversing winding 13 are connected to the upper left-hand and center stationary contact members 18 of the switch 17. The lower left-hand and center stationary contact members 19 of the switch 17 are permanently cross-connected to the corresponding upper stationary contact members 18, as is customary in reversing switches. The middle movable contact member 16 is connected to the left-hand stationary contact member 20 of the switch 14. The right-hand contact members 15 and 20 of the switch 14 are respectively connected to the mains 21 of a suitable single-phase source of energy through the double-pole single-throw switch 22. The plunger 23 of the switch 14 is provided with bridging members 15$^a$ and 20$^a$ which are normally disengaged from the corresponding contact members when the actuating coil 24 is deënergized. One terminal of the actuating coil 24 is connected to one side of the line and the other terminal thereof is connected to the upper right-hand stationary contact member 18 through the stationary contact terminals 25 and bridging member 25$^a$ of the circuit-controlling device 7. The bridging member 25$^a$ is mounted on the reciprocating member 9 and is in engagement with the contact members 25 when the composite ring 8 is in its contracted form. The lower right-hand contact member 19 is permanently connected to the corresponding contact member 18 of the switch 17, and the right-hand movable contact member 16 is connected to the other side of the line. The holding or maintaining contact members 27 of the switch 14 are connected in shunt around the contact members 25. A bridging member 27$^a$ is carried by the plunger 23 and is out of engagement with the contact members 27 when the coil 24 is deënergized.

Having described the various parts comprising my switching arrangement, the operation is as follows: When the switch 22 is closed and the switch 17 is in its neutral position, the coil 24 is not energized and the bridging members 15$^a$, 20$^a$, and 27$^a$, respectively, are disengaged from their corresponding contact members. The motor being at rest, the composite ring 8 is in its retracted form and the bridging member 25$^a$ is in engagement with the contact members 25. When the switch 17 is closed in the upper position, the coil 24 is energized through the contact members 25, thereby drawing the core 23 upwardly and bridging the respective pairs of contact members 15, 20 and 27. The main field winding 12 and the reversing winding 13 are thereby connected in series-circuit relation across the mains 21, and the motor starts as a repulsion motor. When the motor reaches a predetermined speed, the operation of the device 5 causes the commutator-cylinder to be short-circuited, and the motor operates as an induction motor. At a second predetermined speed, the composite ring 8 expands sufficiently to withdraw the bridging member 25$^a$ out of engagement with the contact member 25. The current in coil 24 then flows through the holding or maintaining contact members 27. The above-described conditions prevail as long as the switch remains closed in its upper position.

When it is desired to reverse the motor, the switch 17 is thrown to its lower position while the motor is operating at full speed. As the blades of the switch 17 leave the upper stationary contact members 18, the circuit of the coil 24 is interrupted and the switch 14 opens, thus disconnecting the motor from the mains 21. The motor then decelerates and, when the predetermined speed is reached, the short-circuiting device 5 is withdrawn from the commutator cylinder 3. A further decrease in the speed of the motor causes a contraction of the ring 8 which moves the bridging member 25$^a$ downwardly into engagement with the contact members 25. The circuit of the solenoid 24 is then reëstablished, and the switch 14 closes, thus permitting current to again traverse the windings 12 and 13. As the current in the winding 13 is now reversed, the total resultant field is shifted from one side of the brush 4 to the other, producing the same effect as if, without reversing the current in the winding 13, the brushes were shifted from one side of the neutral axis to the other, as in the ordinary repulsion motor. As the motor is now adapted for repulsion operation the motor continues to decelerate to a standstill and then accelerates in the opposite direction.

It is obvious that the arrangement described with reference to Fig. 1 may be as readily applied to a direct-current motor with only the omission of the short-circuiting device 5.

The core member 1 of the motor shown in Fig. 2 is provided with a main winding 28 and a starting winding 29, the axes of which are displaced 90 electrical degrees with respect to each other. The armature 30 of the motor is provided with a squirrel-cage winding 31, and a centrifugally actuated device 7, similar to the one described with reference to Fig. 1, is mounted on the armature shaft 32. The terminals of the main winding 28 are connected to the upper left-hand and middle contact members 18 of the switch 17 and the corresponding movable contact members 16 are connected to the left-hand contact members 15 and 20 of the electrically operated switch 14. The connections of the actuating coil 24 are the same as described with reference to Fig. 1. The terminals of the starting winding 29 are connected to the line between the switches 14 and 17, one terminal being connected through the contact members 33 and an additional bridging member 33ᵃ that is mounted on the reciprocating member 9 of the device 7.

Having described the various parts with respect to Fig. 2, the operation of the motor is as follows: When the switch 17 is closed in its upper position, current from the mains 21 traverses both the main and starting windings 28 and 29, and the motor starts as a split-phase motor. At a predetermined speed, the expansion of the ring 8 draws the bridging members 25ᵃ and 33ᵃ out of engagement with the corresponding contact members, thereby interrupting the circuit of the starting winding 29 and causing the current in the coil 24 to flow through the holding or maintaining contact members 27 and bridging member 27ᵃ. When the switch is thrown to its lower position, the circuit of the coil 24 is interrupted and the switch 14 opens. It is then impossible for the current to reverse in the winding 28 until the contraction of the ring 8 reëstablishes the circuits of both the starting winding 29 and the actuating coil 24.

It is apparent from the above that my switching arrangement automatically disconnects the motor from the current source until the speed-responsive devices have operated and that the reversing switch may be thrown to any position, while the motor is operating at full speed, without interfering with the operation thereof or damaging the windings of the motor itself.

While I have shown my invention as specifically applied to induction motors of the repulsion-induction and split-phase types, it is not so limited but may be as readily applied to other types of induction motors and to direct-current motors. I desire, therefore, that only such limitations shall be imposed as fall within the scope of the appended claims.

I claim as my invention:

1. The combination with a source of electrical energy, an electric motor provided with a main winding and a centrifugally-actuated starting device, and a reversing switch for connecting said motor winding to said source, of means responsive to the operation of said centrifugally-actuated device for preventing a reversal of current in the winding of said motor until said starting device becomes effective.

2. The combination with a source of electrical energy, an electric motor provided with a main winding and a centrifugally-actuated starting device, and a reversing switch for connecting said motor winding to said source, of a switching device the operation of which is dependent upon said centrifugally-actuated device for preventing a reversal of current in the winding of said motor until said starting device becomes effective.

3. The combination with a source of electrical energy, an electric motor provided with a main winding and a centrifugally-actuated starting device, and a reversing switch for connecting said motor winding to said source, of an electrically-operated switching device connected between said reversing switch and said source, the control circuit of which is operatively connected with said centrifugally-actuated device and said reversing switch.

In testimony whereof, I have hereunto subscribed my name this 29th day of June, 1916.

CLIFFORD A. M. WEBER.